Figure 1:
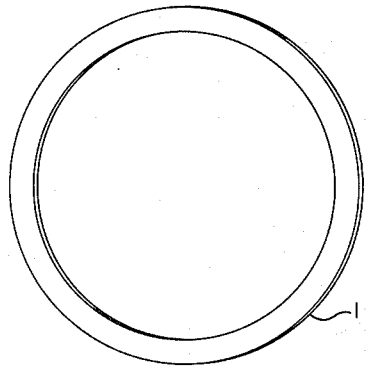

Sept. 28, 1965   J. P. WOODS ETAL   3,208,297
DRIVE BELT
Original Filed Oct. 21, 1958

INVENTORS.
JOHN P. WOODS.
HENRY R. BARTA.
BY
*Charles F. Steininger*
ATTORNEY.

3,208,297
DRIVE BELT
John P. Woods and Henry R. Barta, Dallas, Tex., assignors to The Atlantic Refining Company, Philadelphia, Pa., a corporation of Pennsylvania
Original application Oct. 21, 1958, Ser. No. 768,673, now Patent No. 3,126,626, dated Mar. 31, 1964. Divided and this application May 24, 1963, Ser. No. 282,990
6 Claims. (Cl. 74—231)

This is a divisional application of copending application Serial No. 768,673, entitled Method of Manufacturing a Drive Belt, filed October 21, 1958, now U.S. Patent No. 3,126,626.

The present invention relates to an improved drive mechanism. More particularly, the present invention relates to an improved thin, metallic drive belt, and data recording means including said belt.

Heretofore available driving devices have been unable to satisfactorily fulfill the exacting requirements of present-day data recording, reproducing and computing systems. Probably the most demanding requirements of such systems are the desirability of driving the driven member at a speed which is accurately controlled and closely synchronized with the speed of the driving member, the necessity of maintaining noiseless operation, the desirability of operating satisfactorily over a wide range of speeds, such as at slow speeds as low as one-fiftieth of an inch per minute and at fast speeds in excess of about 12,000 r.p.m., and the desirability of operating over this wide range of speeds without inherent backlash in the system.

Most present-day data recording and reproducing mechanisms utilize gear drives of one type or another. This type of drive is unable to produce an accurately controlled speed and accurate synchronism between the driven member and the driving member simply because it is impossible to produce gears with teeth having the same shape and distance therebetween. Even the most accurately machined gears cannot be made to mesh at a constant speed. In addition, the inherent friction, even in lapped gears, prevents transmission of power from the driving member to the driven member at accurately controlled constant speeds. Further, the noise created by the gear drive is generally recorded along with the recorded infomation, particularly in the recording of transient signals. Still further, a wide range of operating speeds cannot be obtained satisfactorily with such gear-driven mechanisms because of the physical limitations of the gears, such as tooth size and distance between teeth. Another objectionable feature of gear-driven mechanisms is the presence of backlash which also results in variations in the speed of the driven member or nonsynchronism between the driving and driven members.

Another type of driving system which has been used in the past is the belt-type drive mechanism. Such belt drive mechanisms include belts of solid, resilient materials, such as rubber, as well as metal bands encased in resilient material, such as rubber. These belt drive mechanisms also have certain inherent disadvantages including a tendency to stretch, deform and wear appreciably, thus allowing the belt to slip on the pulley or require tightening adjustments of the pulleys both of which result in inaccuracies in the speed of the drive. Further, the thickness of the belt is normally such that the effective diameter of the driving system is not the pulley diameters or the belt diameter but a diameter somewhere beween the two dimensions. This, in effect, also changes the speed of the drive.

It is, therefore, an object of the present invention to provide an improved drive mechanism.

Another object of the present invention is to provide an improved metallic drive belt which is substantially non-deformable in use.

Another object of the present invention is to provide an improved metallic drive belt which is highly resistant to wear.

Another and further object of the present invention is to provide an improved metallic drive belt having low frictional losses.

Still another object of the present invention is to provide an improved metallic drive belt having a greatly reduced tendency to slip in use.

A further object of the present invention is to provide an improved driving mechanism for data handling means.

Still another object of the present invention is to provide an improved driving mechaism for data handling means which is substantially noise-free.

A still further object of the present invention is to provide a drive mechanism for data handling means which may be operated at an accurately controlled speed and in which the driving and driven members are closely synchronized.

Another and further object of the present invention is to provide an improved drive mechanism for data handling means which is substantially free of backlash.

Still another object of the present invention is to provide an improved drive mechanism for data handling means which will not change from a predetermined speed range through continued use.

Figure 3:
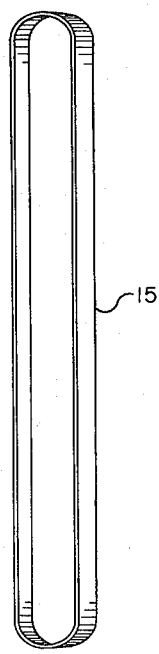
Figure 2:
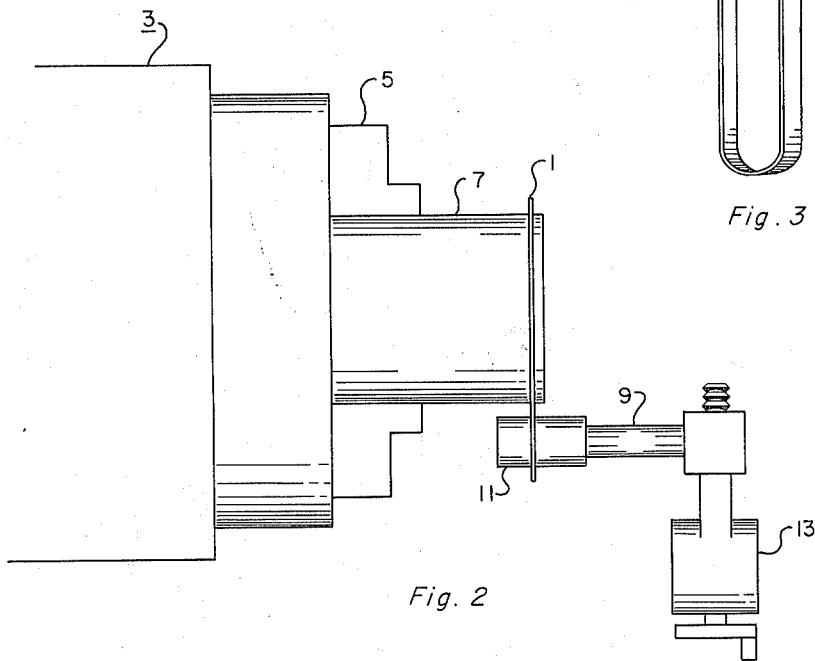

Other and further objects of the present invention will become apparent from the following detailed description when read in conjunction with the drawings, wherein:

FIGURE 1 shows a metallic blank used to form the metallic belt of the present invention, FIGURE 2 shows the mechanism for stretching and forming the belt in accordance with the present invention, and FIGURE 3 shows a finished metallic belt.

Briefly, in accordance with the present invention, a drive belt is provided comprising a thin, continuous metal belt which has been stretched by an amount which is above the elastic limit of the metal employed but is below the ultimate strength limit of the metal. This improved metallic belt is conveniently manufactured by forming an annular blank from a flat sheet of a suitable metal and thereafter stretching the annular blank to form a continuous belt of a predetermined length. During the stretching operation, the metal will be stretched by an amount such that the inner circumference of the annular blank will be equal to the outer circumference thereof and the amount the blank is stretched will exceed the elastic limit of the metal but will be below the ultimate strength limit of the metal.

The continuous metallic belts formed in accordance with the present invention are particularly useful in systems requiring accurate speed control, accurate synchronism between the driving and driven members and substantially noiseless operation. As pointed out previously, these requirements are most exacting in present-day data recording, reproducing and computing systems. For example, in the field of exploration for petroleum deposits, including logging operations in a well bore and surface prospecting operations, there has been a substantial increase in the use of a magnetic recording, the reproduction of transient signals from magnetic records or other type records, and the use of analog and digital-type computing mechanisms to operate on the recorded information. Such devices, which are well-known to those skilled in the art of petroleum exploration, require extremely accurate speed control and elimination of any interference by noise in the recording or reproducing operations, both in revolving the record transporting drum and in positioning the recording element to record or reproduce more than one signal or trace. For example, in the recordation of a transient signal utilizing a carrier wave, particularly in the recordation of a frequency modulated transient signal, variations in the speed of recordation or reproduction will result in a distorted record or reproduced signal. Deviations of the modulated signal from the original signal plus the carrier can also be caused by the recordation of instrument noise during the recording or reproducing operations. In addition, if one recording system is to be used for the original recordation and another is to be used for playback and re-recording, exact speed control is of the essence. For instance, in magnetically recording a frequency modulated signal, if we can assume that the carrier frequency is 2,500 cycles per second, a speed change at the zero transient signal level will cause the carrier wave frequency to deviate from the mean value and produce noise. In other types of modulated recording, such as pulse width modulation, the recorded modulated signal or the reproduced demodulated signal can also be adversely affected by variations in the speed of the recording mechanism. As a result, most magnetic recording systems having a gear-drive mechanism use a special channel or other means in an effort to cancel out the gear noise.

In contrast to these prior art devices, the improved drive belt of the present invention and the improved recording mechanism employing this drive belt are highly advantageous in that operating noise is substantially eliminated, accurate predetermined drive speeds can be attained and accurate synchronism between the driving and driven mechanisms obtain, primarily because excessive friction and slippage are eliminated, and the characteristics of the belt and the drive mechanism do not change through extended use, i.e., the length of the belt does not change through continued use due to stretching or wear.

In producing the metallic belt of the present invention, it was also found that a simple and inexpensive method of fabrication resulted from attempts to eliminate some of the disadvantages inherent in conventional methods of manufacturing steel belts. For example, first attempts to produce an endless belt of the type described involved cutting an elongated, rectangular strip of the desired width and length from a piece of sheet metal and welding or brazing the ends together to form an endless belt. It was found, however, that in order to attain smooth operation, the welded belt had to be accurately ground along its edges; and the joint itself had to be ground along the faces, which weakened the structure, and any undue pulling or stretching of the belt caused the joint to break apart.

It was, however, found that these disadvantages could be eliminated by operating in accordance with applicants' novel method of manufacture.

Referring in detail to the drawings, an annular blank 1 as shown in FIGURE 1 is formed from a flat sheet of thin metal. This annular, substantially washer-shaped blank is then placed on lathe 3 and a small mandrel 9 and stretched until its inner circumference is equal to its outer circumference and, at the same time, the belt is stretched to a predetermined length.

In more detail, the first step of the operation is to cut, or otherwise produce, a substantially circular disk from the selected sheet metal, which is approximately ⅛ to ¼ inch larger than the finished outside diameter of annular blank 1. The sheet metal employed in accordance with the present invention must have sufficient ductility to permit a certain amount of cold stretching; and, in particular, must be sufficiently ductile to permit stretching of the inner circumference of annular blank 1 until it is equal to the outer circumference of the annular blank while at the same time the amount the metal is stretched must exceed the elastic limit of the metal, so that a permanent set occurs, but be below the ultimate strength limit of the metal, so that rupture does not occur. Preferably, a nonmagnetic metal is employed, particularly where the belt is to be used in a magnetic recording apparatus. However, for other uses, or for uses where the belt is outside the field of magnetic flux, magnetic materials exhibiting the desired degree of ductility may also be employed. Suitable materials in accordance with the present invention include stainless steels, particularly types 302 and 304, which are fully annealled stainless steels and are nonmagnetic, light grades of carbon steel, phosphor bronze, beryllium copper and the like. Applicants prefer to use the stainless steels since, in addition to their other advantages, they are non-corrosive. Stainless steel belts in accordance with the present invention have been tested for thousands of hours at speeds exceeding 12,000 r.p.m. without any measurable stretching or wear occurring or failure in any other respect. The sheet metal employed in accordance with applicants' invention is preferably about 0.002 to 0.003 inch thick.

Now assume, for purposes of illustration, that 100 belts 19⅞ inches in circumference with a width of ³⁄₁₆ inch are desired. One hundred oversized circular disks would be punched or otherwise cut from a sheet of metal.

After having cut out the desired number of disks, the disks are stacked between the opposing faces of an appropriate clamping jig, and the center portions of the disks are machined out by boring, milling or other suitable operation. In the particular example given, the finished inside diameter is 6⅛ inches.

As a third step in the operation, the resulting annular blanks are then stacked between the opposing faces of an appropriate clamping jig having a boss which exactly fits the inner circumference of the blank. The outside circumference of the annular blank is then milled or ground to a predetermined circumference resulting in annular blank 1 of FIGURE 1. This outside circumference is preferably slightly less than the desired length of the finished belt since some stretching of the outside circumference is also desirable in order to have a belt smoothly and accurately dimensioned; and, of course, the difference between the inside diameter and outside diameter of the annular blank should be approximately equal to the desired width of the finished belt. It should be recognized, however, that some slight variation in the latter respect will obtain since on stretching some reduction in width will result.

Finally, the accurately formed annular blank 1 is stretched or spun-out to form the finished belt 15 of FIGURE 3. Referring to FIGURE 2 of the drawings, a lathe 3 is shown in which a cylindrical mandrel 7 is chucked by means of chuck 5. Preferably, a light cut is made on mandrel 7 in order to be certain that the mandrel is true. Mounted on the transverse feed 13 of the lathe is cylindrical shaft 9 carrying a rotatable spinner 11. It should be recognized, however, that the spinner 11 on shaft 9 is not absolutely essential but that a simple cylindrical shaft would suffice. In any event, both members around which blank 1 is mounted and stretched have generally circular cross sections. An annular blank 1 is then slipped over mandrel 7 and spinner 11 of shaft 9. As mandrel 7 is rotated at a speed which will not throw the annular blank off the mandrels (for example, approximately 300 r.p.m.), shaft 9 is moved transversely away from mandrel 7 by means of transverse feed 13 until the desired length of band is obtained. As is known to one skilled in the art, most metal working lathes are provided with accurate scales on their transverse feed, and by moving the transverse feed to an exact point as shown by the scale, one may consistently produce belts of exactly the same length. In the particular example given, the belt is stretched until its circumference is 19⅞ inches.

Thus, it may be seen that applicants' method of manufacturing a continuous metal belt, the resultant continuous belt, and the data recorder employing this belt result in numerous advantages not heretofore obtainable. It should be recognized, however, that the examples and illustrations given are not all inclusive and that substitutions of equivalent materials, performance of equivalent machining and forming steps and fabrication of equivalent data recorders are contemplated herein. For example, one may substitute any one of a long list of metals for those specifically enumerated so long as the specified properties exist, any of a number of metal working operations may be employed to carry out each step of the method of manufacture and rubber, plastic or metal pulleys may be employed in the data recorder although metal pulleys are preferred.

We claim:

1. A drive belt comprising a thin, continuous metal band characterized by permanent and substantial deformation due to having been subjected to tension beyond its elastic limit and below its breaking stress.

2. A drive belt in accordance with claim 1 wherein said band is composed of a nonmagnetic metal.

3. A drive belt in accordance with claim 1 wherein said band is flat and has a cross section of uniform thickness.

4. A drive belt in accordance with claim 1 wherein said band is composed of stainless steel.

5. A drive belt in accordance with claim 1 wherein said band is composed of beryllium copper.

6. A drive belt in accordance with claim 1 wherein said band is no more than about 0.002 to 0.003 inch thick.

References Cited by the Examiner

UNITED STATES PATENTS 1,140,890   5/15   Eloesser.
1,309,245   7/19   Coryell.

DON A. WAITE, *Primary Examiner.*